US010632996B2

(12) United States Patent
Lechlitner et al.

(10) Patent No.: US 10,632,996 B2
(45) Date of Patent: Apr. 28, 2020

(54) SYSTEMS AND METHODS FOR CONTROLLING A HYBRID ELECTRIC POWERTRAIN

(71) Applicant: Ford Global Technologies, LLC, Dearborn, MI (US)

(72) Inventors: Craig Lechlitner, Belleville, MI (US); Kenneth Frederick, Dearborn, MI (US); Floyd Cadwell, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 436 days.

(21) Appl. No.: 15/590,979

(22) Filed: May 9, 2017

(65) Prior Publication Data

US 2018/0326988 A1 Nov. 15, 2018

(51) Int. Cl.

| B60W 30/18 | (2012.01) |
| B60W 10/06 | (2006.01) |
| B60W 10/08 | (2006.01) |
| B60W 10/184 | (2012.01) |
| B60W 10/30 | (2006.01) |
| B60W 20/14 | (2016.01) |
| B60K 6/442 | (2007.10) |
| B60W 20/15 | (2016.01) |
| B60K 6/445 | (2007.10) |
| B60W 20/19 | (2016.01) |

(52) U.S. Cl.
CPC ....... *B60W 30/18136* (2013.01); *B60K 6/442* (2013.01); *B60K 6/445* (2013.01); *B60W 10/06* (2013.01); *B60W 10/08* (2013.01); *B60W 10/184* (2013.01); *B60W 10/30* (2013.01); *B60W 20/14* (2016.01); *B60W 20/15* (2016.01); *B60W 20/19* (2016.01); *B60W 30/18036* (2013.01); *B60W 30/18127* (2013.01); *B60W 2510/0638* (2013.01); *B60W 2510/083* (2013.01); *B60W 2510/244* (2013.01); *B60W 2520/10* (2013.01); *B60W 2540/10* (2013.01); *B60W 2710/0644* (2013.01); *B60W 2710/0666* (2013.01); *B60W 2710/18* (2013.01); *B60W 2710/305* (2013.01); *B60W 2720/30* (2013.01); *B60Y 2200/92* (2013.01); *Y10S 903/93* (2013.01); *Y10S 903/947* (2013.01)

(58) Field of Classification Search
None
See application file for complete search history.

(56) References Cited

U.S. PATENT DOCUMENTS 5,951,614 A * 9/1999 Tabata ............... B60K 6/48
701/54
6,603,215 B2 8/2003 Kuang et al.
(Continued)

*Primary Examiner* — Nicholas K Wiltey
(74) *Attorney, Agent, or Firm* — David Kelley; McCoy Russell LLP

(57) ABSTRACT

Methods and systems are provided for enhancing reverse driving torque in a powersplit hybrid electric vehicle powertrain. In one example, a method may include accelerating an engine via a generator functioning as a motor, any number of times, to provide an engine braking torque that may increase a reverse driving torque to enable the vehicle to be propelled in reverse at a vehicle speed above a threshold vehicle speed. In this way, reverse gradability may be improved and customer satisfaction increased.

18 Claims, 9 Drawing Sheets

(56) References Cited

U.S. PATENT DOCUMENTS

| | | | | |
|---|---|---|---|---|
| 7,216,729 B2* | 5/2007 | Syed | ................ | B60K 6/48 180/65.28 |
| 7,285,869 B2 | 10/2007 | Syed et al. | | |
| 7,576,501 B2 | 8/2009 | Okubo et al. | | |
| 9,545,839 B2* | 1/2017 | Okubo | ................ | B60K 6/365 |
| 9,994,214 B2* | 6/2018 | Kato | ................ | B60L 50/15 |
| 2002/0023790 A1* | 2/2002 | Hata | ................ | B60K 6/40 180/65.225 |
| 2002/0179070 A1* | 12/2002 | Inoue | ................ | B60W 10/06 123/672 |
| 2006/0022469 A1* | 2/2006 | Syed | ................ | B60K 6/44 290/40 C |
| 2008/0215201 A1* | 9/2008 | Okubo | ................ | B60K 6/365 701/22 |
| 2010/0063704 A1* | 3/2010 | Okubo | ................ | B60K 6/365 701/99 |
| 2011/0120789 A1* | 5/2011 | Teraya | ................ | B60K 6/445 180/65.25 |
| 2012/0013310 A1* | 1/2012 | Clark | ................ | H02J 7/1446 323/204 |
| 2012/0116665 A1* | 5/2012 | Aoki | ................ | B60T 8/17558 701/301 |
| 2012/0316029 A1* | 12/2012 | Nedorezov | ............ | B60W 10/06 477/71 |
| 2014/0171260 A1* | 6/2014 | Dalum | ................ | B60W 20/10 477/5 |
| 2014/0229085 A1* | 8/2014 | Moriya | ................ | B60W 10/06 701/70 |
| 2015/0032358 A1* | 1/2015 | Amemiya | ................ | B60K 6/48 701/104 |
| 2015/0197233 A1* | 7/2015 | Martin | ................ | B60W 10/06 701/22 |
| 2015/0224975 A1* | 8/2015 | Martin | ................ | B60W 10/06 701/22 |
| 2016/0194002 A1* | 7/2016 | Kelly | ................ | B60W 50/14 701/22 |
| 2017/0151939 A1* | 6/2017 | Hokoi | ................ | B60L 50/16 |
| 2017/0267242 A1* | 9/2017 | Khafagy | ................ | B60W 10/06 |
| 2017/0291597 A1* | 10/2017 | Hata | ................ | F02N 5/04 |
| 2018/0079397 A1* | 3/2018 | Nakagawa | ................ | B60T 8/17 |
| 2019/0162159 A1* | 5/2019 | Dudar | ................ | F02P 17/00 |
| 2019/0218988 A1* | 7/2019 | Dudar | ................ | F02B 37/186 |
| 2019/0249618 A1* | 8/2019 | Dudar | ................ | F01L 13/0005 |

* cited by examiner

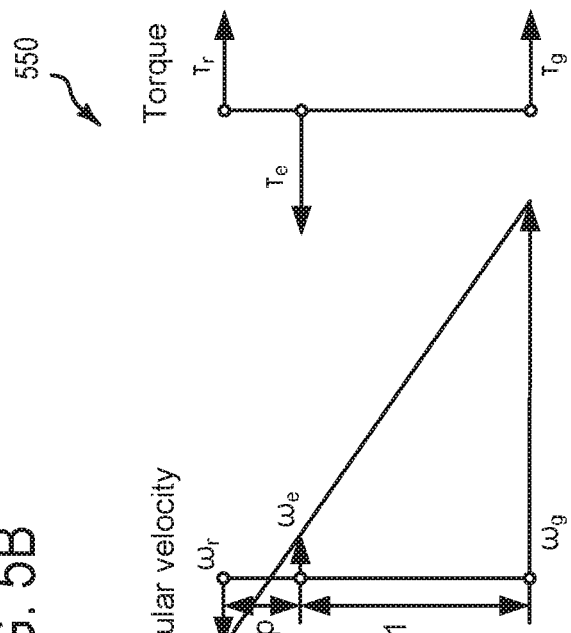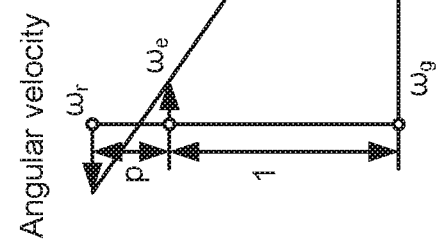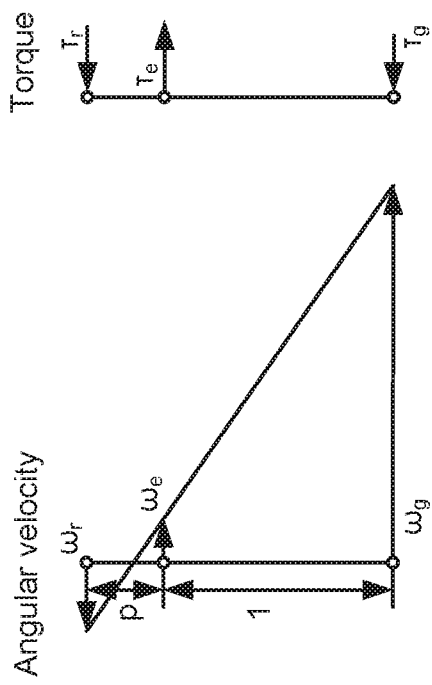
FIG. 5A
FIG. 5B

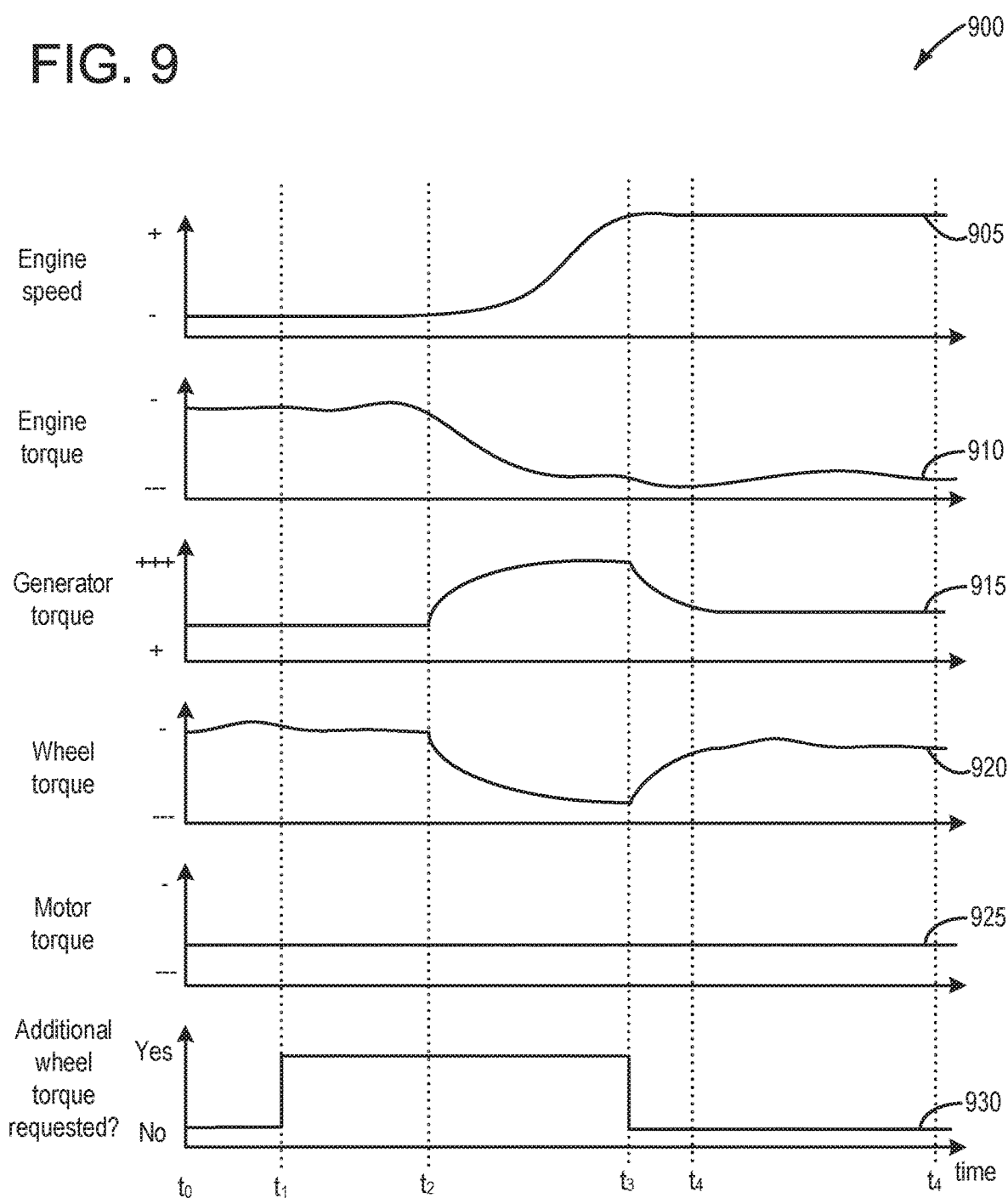

SYSTEMS AND METHODS FOR CONTROLLING A HYBRID ELECTRIC POWERTRAIN

FIELD

The present description relates generally to methods and systems for controlling a vehicle engine to increase reverse torque output capability in a powersplit hybrid.

BACKGROUND/SUMMARY

A known hybrid electric vehicle powertrain with split power flow paths is disclosed in U.S. Pat. No. 7,285,869, which is assigned to the assignee of the present invention. That powertrain includes an electrical power source including a traction motor, a battery, and an electric generator that is capable of functioning as a motor. An engine is a mechanical power source, and a planetary gear system establishes divided torque delivery paths between the electrical and mechanical sources of power and vehicle traction wheels. The planetary gear unit includes a ring gear connected drivably to the traction wheels, a sun gear drivably connected to the generator, and a carrier drivably connected to the engine. The generator, the motor, and the battery are electrically coupled.

Engine torque applied to the carrier during forward drive in a divided power delivery mode is in a direction that is opposite to the direction of reaction torque applied to the sun gear by the generator. The torque applied to the carrier by the engine is equal to the sum of the torque applied by the engine to the ring gear and the torque applied to the sun gear.

If the electric motor is used during an electric motor launch with the engine off, the motor will drive the ring gear in the same direction as the direction of rotation of the motor rotor. Since the carrier is directly connected to the engine, which is not fueled at that time, the sun gear rotates relatively freely while the carrier is not turning. The planetary gear unit at that time is essentially without a reaction element, except for a small torque delivered to the sun gear by reason of bearing friction losses and gear friction losses.

If the generator is commanded to provide assistance to the motor during a forward motor launch, the generator is controlled to function as a motor as it rotates in a negative direction (e.g. counterclockwise as viewed from the engine's location). At that time, torque is applied to the carrier in a negative direction. An overrunning coupling provides reaction torque at that time so that the generator torque can be transmitted to the ring gear, which drives the traction wheels in a forward driving direction. The battery then provides power to both the motor and the generator. However, the generator may not be able to assist the motor during a reverse launch since there is no reaction torque available to allow generator torque to be distributed to the ring gear.

Since positive engine torque (e.g. clockwise torque as viewed from the engine's location) will reduce the drive torque contribution from the motor, a known strategy utilized by a vehicle system controller may minimize the use of the engine during a reverse driving operation. Under such circumstances, there is a limited operating range in which the engine may be used to supply driving torque to the generator to charge the battery when the battery does not have a sufficient state-of-charge to supply power to the motor.

A peak reverse wheel torque is an important factor that determines a vehicle's ability to climb a steep grade, or to maneuver the vehicle in reverse in certain off-road conditions, or to maneuver the vehicle in reverse over obstacles, such as a roadway curb. However, a powertrain of the type disclosed in U.S. Pat. No. 7,285,869 can develop only a limited peak reverse drive wheel torque.

U.S. Pat. No. 7,576,501 teaches a strategy that uses hybrid powertrain components in such a way as to permit the engine to be motored in an unfueled state to boost reverse driving torque. Briefly, the strategy includes motoring the engine unfueled via a generator during reverse drive operation. With the engine unfueled, negative engine brake torque may be equal to the engine's pumping and friction loss multiplied by the gear ratio. In reverse drive, this may boost peak reverse wheel torque to a value beyond the ability of the traction motor to create reverse wheel torque. U.S. Pat. No. 7,576,501 further teaches selecting a speed at which the engine is motored unfueled via the generator. Because the battery supplies electrical power to provide enhanced, or boosted, reverse wheel torque, power draw is minimized to prolong boosted reverse drive operation. Thus, U.S. Pat. No. 7,576,501 teaches minimizing power consumption by running the engine at its lowest possible engine speed.

The inventors herein have recognized potential issues with such a solution, and have developed systems and methods to at least partially address them. In one example, a method is provided, comprising accelerating an engine coupled to wheels of a hybrid motor vehicle, the engine accelerated via a generator temporarily functioning as a motor, responsive to a driver-requested negative wheel torque that exceeds a capability of an electric motor, also coupled to one or more of the wheels, to provide the negative wheel torque; and operating the engine based only on driver-demand responsive to vehicle speed increasing beyond a threshold vehicle speed. In this way, a vehicle speed may be increased in reverse to a threshold speed that may enable the vehicle to overcome an obstacle or a grade that is preventing the vehicle from achieving the threshold speed.

As an example, accelerating the engine via the generator may provide engine braking torque. As another example, the engine may be accelerated at a maximum rate to provide the negative wheel torque.

In another example, in response to accelerating the engine, and further responsive to an indication that the vehicle speed does not increase beyond the threshold vehicle speed, the method may include decreasing engine speed until the engine speed is below a threshold engine speed, and may further include repeating the accelerating the engine to increase vehicle speed to or beyond the threshold vehicle speed. For example, decreasing engine speed and repeating the accelerating the engine may be conducted any number of times while the driver-requested negative wheel torque exceeds the capability of the motor. In some examples, accelerating the engine may be conducted with wheel brakes released, the wheel brakes configured to provide braking torque to the wheels, and where the wheel brakes are applied in response to the vehicle speed not increasing beyond the threshold vehicle speed, and just prior to decreasing engine speed.

As another example, the vehicle may comprise a powersplit hybrid, the powersplit hybrid including the engine, the electric motor, the generator, a battery, and gearing forming separate power flow paths during forward drive to the wheels from the engine and the electric motor, and from the electric motor and the generator during reverse drive. The electric motor may operate in one direction during forward drive and in a direction opposite to the one direction during reverse drive. Still further, accelerating the engine via the generator may be conducted in the absence of the engine combusting air and fuel.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5A shows a lever analogy diagram of planetary gear kinematics for a hybrid vehicle powertrain in reverse drive for a powertrain of the type shown in FIG. 1.

FIG. 5B shows a lever analogy diagram of planetary gear kinematics for a hybrid vehicle powertrain of the type shown in FIG. 1, having improved reverse drive performance characteristics.

FIG. 9 shows an example timeline 900 for improved reverse drive performance of a vehicle powertrain of the type shown in FIG. 1, where the improved reverse drive performance is enabled via the method of FIG. 7.

DETAILED DESCRIPTION

Figure 1:
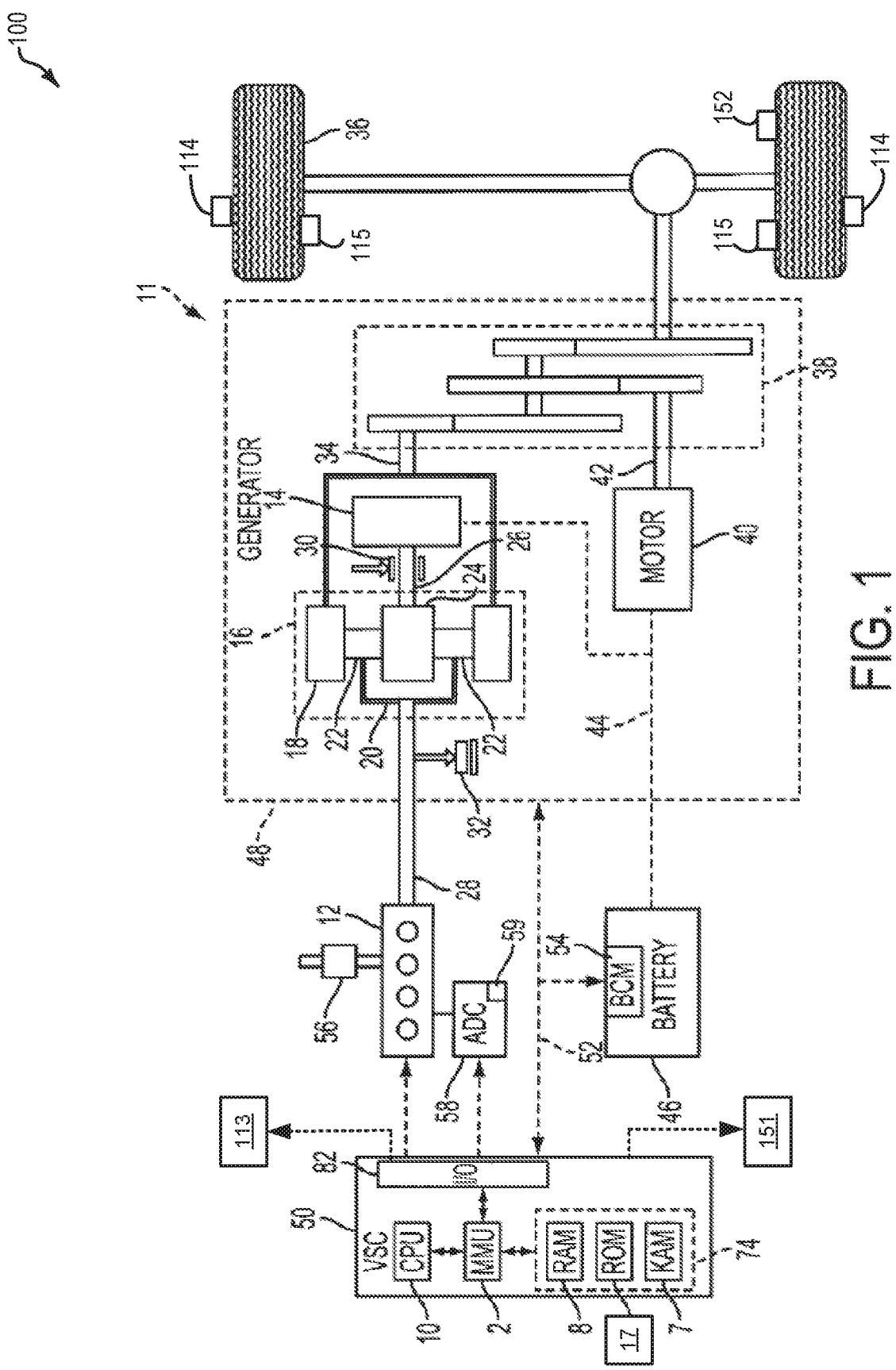
FIG. 1 shows an example powertrain in a hybrid electric vehicle (HEV) system
Figure 3:
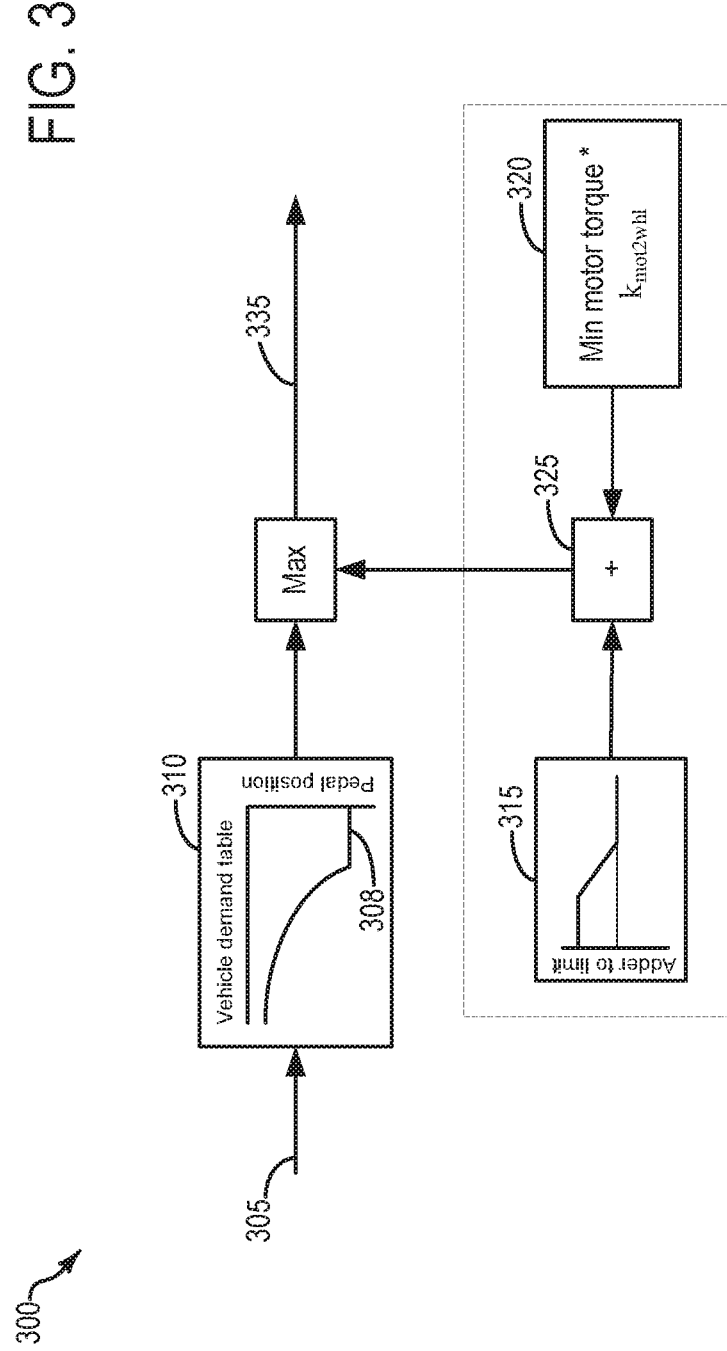
FIG. 3 shows a diagram of how a wheel torque limit may be calculated and applied to a driver request for a powertrain of the type shown in FIG. 1.
Figure 4:
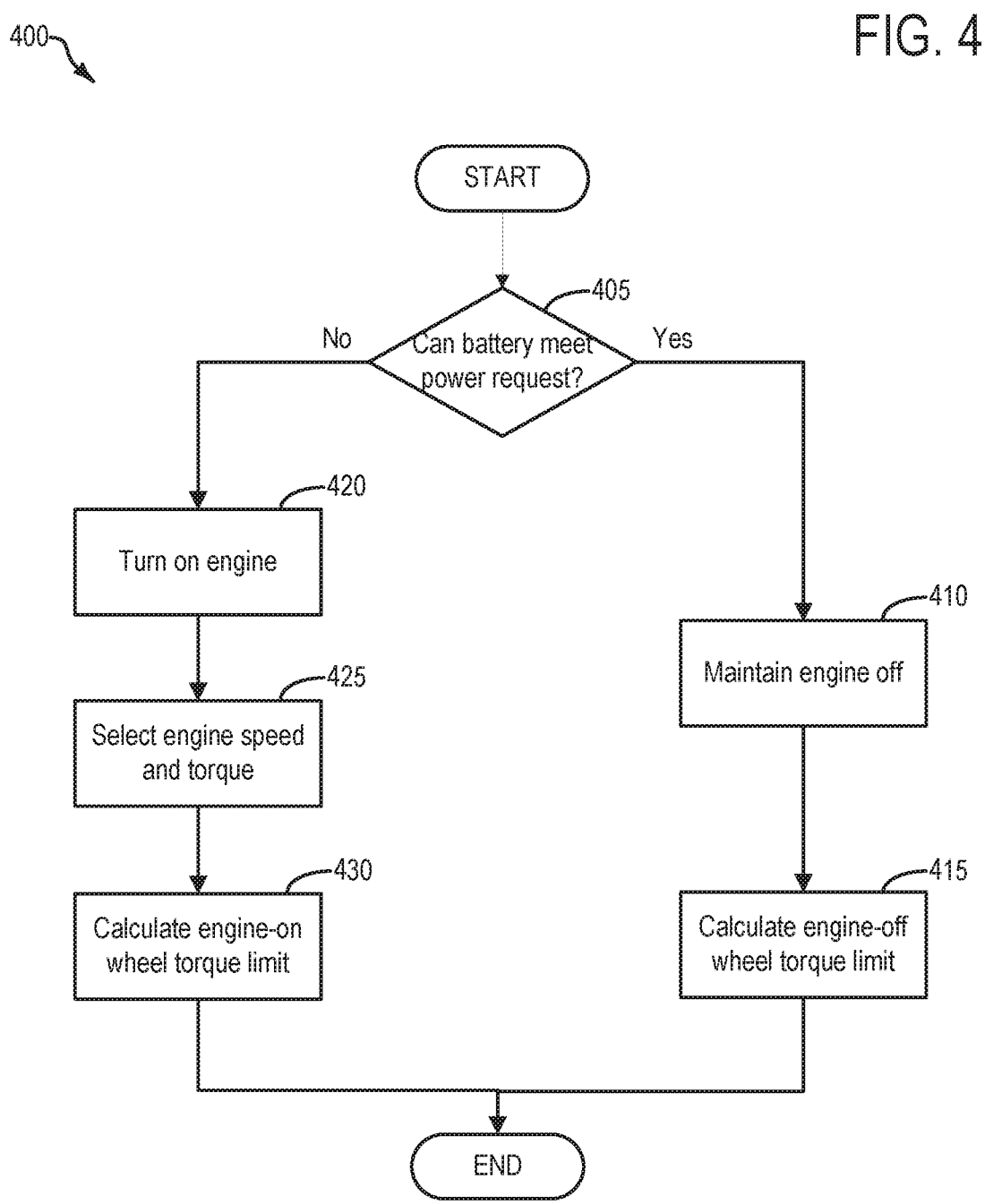
FIG. 4 shows a high level example flowchart illustrating how a vehicle system controller may choose an engine operating point and system limits during reverse drive for a powertrain of the type shown in FIG. 1.

The following description relates to systems and methods for improving reverse gradability in a split power delivery hybrid vehicle of the type illustrated at FIG. 1. Such a vehicle may include an engine, a planetary gear set, a second gear set, a motor, and a generator. In one example, depicted at FIG. 2, a vehicle system controller may determine an engine state (e.g. on or off) and torque limits. If the vehicle operator's request for torque exceeds the wheel torque limit, the vehicle operator's request may be clipped. If the engine is off, the wheel torque limit may be simply a negative torque limit of a motor, multiplied by a gear ratio, as illustrated in FIG. 3. Alternatively, if the engine is on, the wheel torque limit may comprise a sum of engine torque and the negative torque limit of the motor. A method illustrating how a vehicle controller may choose an engine operating point and system limits during reverse drive, is illustrated at FIG. 4.

As mentioned, if the engine is off, a wheel torque limit may be the negative torque limit of the motor, multiplied by a gear ratio. If the engine is on, the wheel torque limit may account for a torque reduction that occurs due to a positive engine brake torque. However, if the engine is being motored, or driven, unfueled by a generator using battery power, the net wheel torque may decrease by a quantity equal to the negative engine brake torque multiplied by a gear ratio. It may be understood that negative engine brake torque is equal to the engine's pumping and friction loss multiplied by the gear ratio. In reverse drive, this may boost the peak reverse wheel torque to a value beyond the ability of the traction motor to create reverse wheel torque. Such a feature may improve reverse gradability performance of the vehicle. FIG. 5A illustrates a lever analogy diagram for angular velocities and torques acting on each of the elements of a planetary gear unit when an engine is on and the vehicle is being propelled in reverse, while FIG. 5B illustrates a similar lever analogy diagram under conditions where the engine is motored by the generator, to improve reverse gradability.

Figure 6:
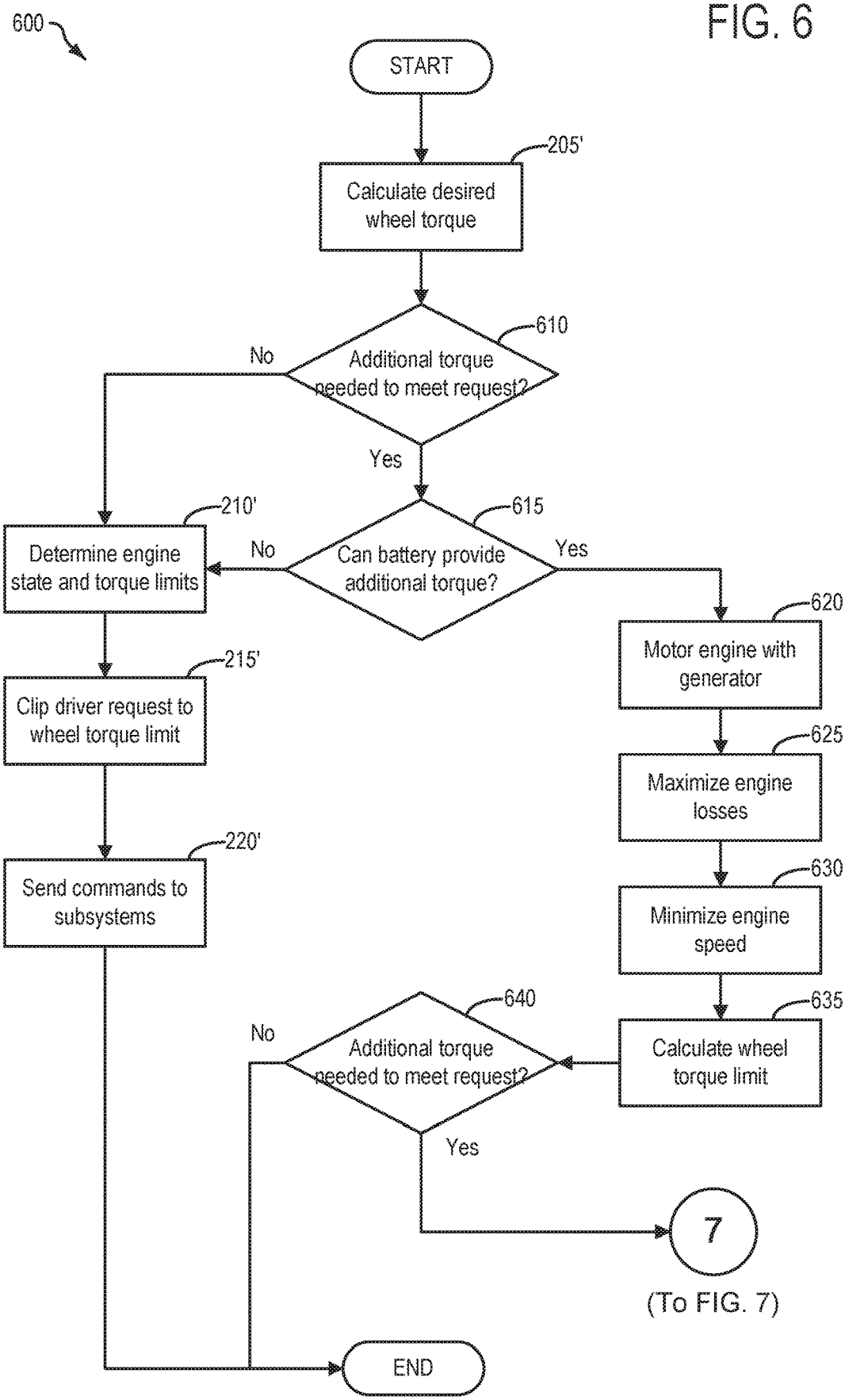
FIG. 6 shows a high level example method illustrating a strategy for improving reverse drive performance, and minimizing use of battery power during reverse drive operation, for a powertrain of the type shown in FIG. 1.

FIG. 6 illustrates a method for propelling a vehicle system of the type illustrated at FIG. 1, in reverse. If a desired wheel torque may be met via a motor, then the method may essentially comprise the method of FIG. 2. Alternatively, if the desired wheel torque cannot be met, and where an onboard energy storage device (e.g. battery) can provide the additional torque, a strategy may be utilized where the engine is motored unfueled by the generator, with engine speed minimized and engine losses maximized, in an attempt to increase negative wheel torque.

Figure 7:
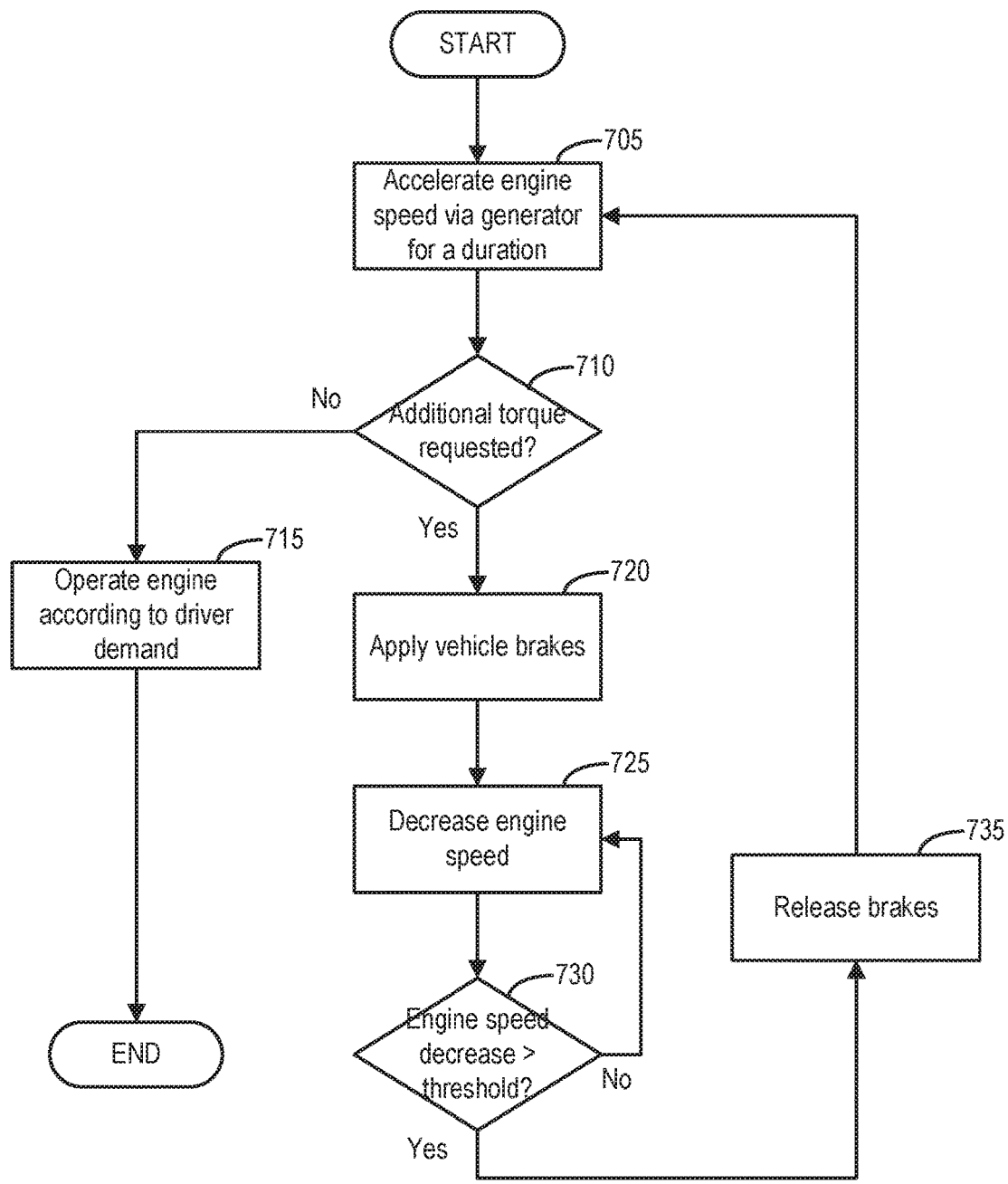
FIG. 7 shows a high level example method illustrating a strategy of the present invention for further improving reverse drive performance in a split power delivery hybrid vehicle of the type illustrated in FIG. 1.
Figure 8:
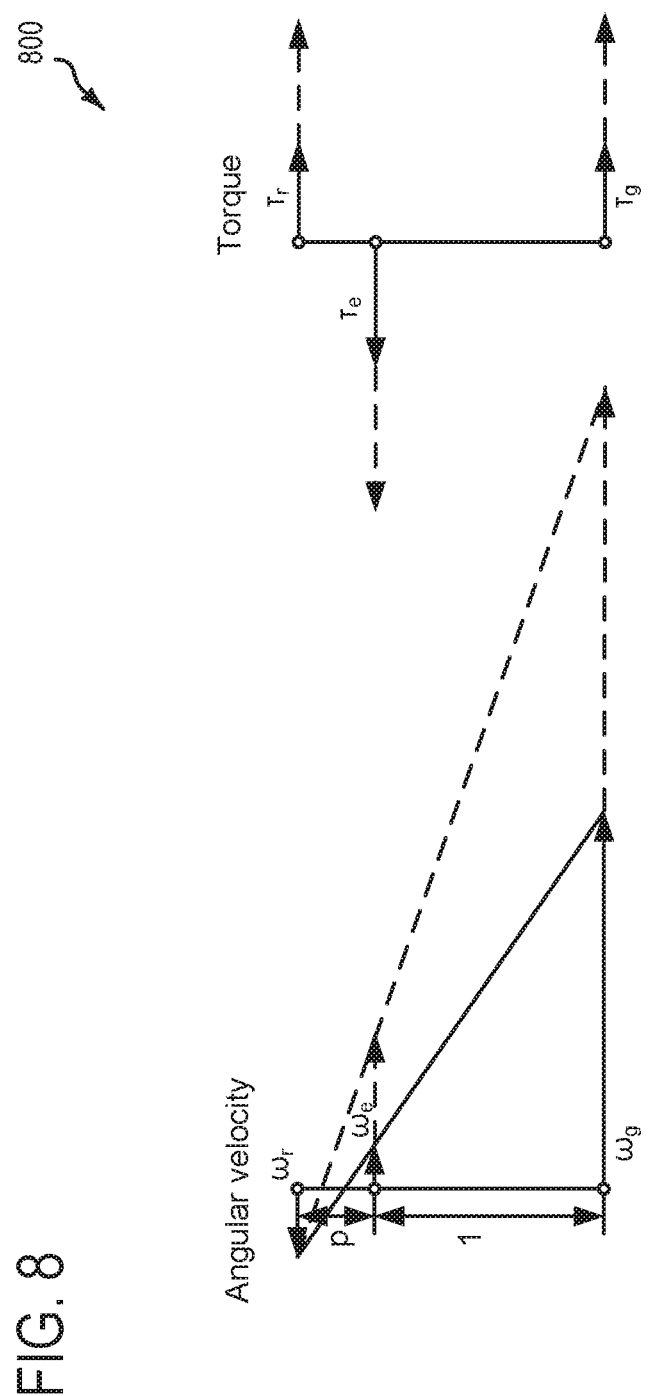
FIG. 8 shows a lever analogy diagram of planetary gear kinematics for a hybrid vehicle powertrain of the type shown in FIG. 1, the vehicle using improved reverse drive performance according to the method of depicted at FIG. 7.

However, there may be circumstances where operating the engine as discussed with regard to FIGS. 2-6 is not enough to enable the vehicle to be propelled in reverse. For example, the lever analogy of FIG. 5B illustrates a situation where engine speed is minimized and engine losses maximized, to preserve battery power when attempting to propel the vehicle in reverse. If such a method is carried out by the vehicle controller, but the vehicle still is not propelled in reverse, then still additional torque may be desired. In such an example, the engine may be accelerated rapidly, to further increase negative wheel torque, according to the method of FIG. 7. It may be understood that the method of FIG. 7 may be repeated as many times as desired, until the vehicle is indicated to be being propelled in reverse. A lever analogy diagram depicted at FIG. 8 illustrates how accelerating the engine unfueled with the generator may result in an increased negative engine torque, thus resulting in an increased negative wheel torque. A timeline illustrating the methodology depicted at FIG. 7, is depicted at FIG. 9.

Turning now to the figures, FIG. 1 includes a schematic block diagram representation of a vehicle system 100 to illustrate one embodiment of a system or method for controlling a vehicle powertrain according to the present invention. Vehicle system 100 generally represents any vehicle having a conventional or hybrid electric powertrain with an internal combustion engine (ICE) 12. In the depicted embodiment, the vehicle system 100 is a hybrid electric vehicle (HEV) system wherein the powertrain 11 includes an internal combustion engine 12, a battery 46, and an electrical machine (e.g., a motor and/or a generator). However, it will be appreciated that in alternate embodiments, the torque control methods discussed herein may be applied to other hybrid vehicle configurations as well as conventional vehicles having an internal combustion engine.

The vehicle powertrain 11 includes engine 12 and an electric machine coupled to the engine via a gearset (herein depicted as generator 14). As such, generator 14 may also be referred to as an electric machine as it may operate as either a motor or a generator. Engine 12 and generator 14 are connected through a power transfer unit or transmission, which in this embodiment is implemented by a planetary gearset 16. As such, other types of power transfer units, including other gearsets and transmissions, may be used to connect engine 12 to generator 14. Planetary gearset 16 includes a ring gear 18, a carrier 20, planet gears 22, and a sun gear 24.

Generator 14 can be used to provide electric current to charge battery 46 or operate motor 40. Alternatively, generator 14 may be operated as a motor to provide an output torque to shaft 26 connected to sun gear 24. Similarly, operation of engine 12 supplies a torque to shaft 28, which is connected to carrier 20. A brake 30 is provided for selectively stopping rotation of shaft 26, thereby locking sun gear 24 in place. Since this configuration allows torque to be transferred from generator 14 to engine 12, a one-way clutch 32 is provided so that shaft 28 rotates in only one direction. In addition, generator 14 can be used to control the rotational speed of engine 12 via planetary gearset 16 and shaft 28 when and if desired.

Ring gear 18 is connected to a shaft 34, which is connected to vehicle drive wheels 36 through a second gearset 38. Vehicle system 100 further includes a motor 40, which can be used to output torque to shaft 42. Motor 40 may also be referred to as an electric machine as it may operate as either a motor or a generator. In particular, battery 46 may be configured to power the electric machine and operate it as a motor. Other vehicles within the scope of the present invention may have different electric machine arrangements, such as more or less than the two electric machines (generator 14 and motor 40) depicted herein. In the embodiment shown in FIG. 1, both electric machines 14, 40 may be operated as motors using electric current from battery 46 or another source of electric current to provide a desired output torque. Alternatively, both electric machines 14, 40 may be operated as generators supplying electrical power to a high voltage bus 44 and/or to an energy storage device, represented by high voltage battery 46. Other types of energy storage devices and/or output devices that can be used include, for example, a capacitor bank, a fuel cell, a flywheel, etc.

As shown in FIG. 1, motor 40, generator 14, planetary gear set 16, and a portion of second gear set 38 may generally be referred to as a transaxle 48. One or more controllers 50 implemented in hardware and/or software are provided to control engine 12 and the components of transaxle 48. In the embodiment of FIG. 1, controller 50 is a vehicle system controller (VSC). Although VSC 50 is shown as a single controller, it may include multiple hardware and/or software controllers. For example, VSC 50 may include a separate powertrain control module (PCM), which could be software embedded within VSC 50, or the PCM could be implemented by a separate hardware device with corresponding software. Those of ordinary skill in the art will recognize that a controller may be implemented by a dedicated hardware device that may include programmed logic and/or an embedded microprocessor executing computer readable instructions to control the vehicle and powertrain. A controller area network (CAN) 52 may be used to communicate control data and/or commands between VSC 50, transaxle 48, and one or more other controllers, such as battery control module (BCM) 54. For example, BCM 54 may communicate data such as battery temperature, state-of-charge (SOC), discharge power limit, and/or other operating conditions or parameters of battery 46. Devices other than battery 46 may also have dedicated controllers or control modules that communicate with VSC 50 to implement control of the vehicle and powertrain. For example, an engine control unit (ECU) may communicate with VSC 50 to control operation of engine 12. In addition, transaxle 48 may include one or more controllers, such as a transaxle control module (TCM), configured to control specific components within 48, such as generator 14 and/or motor 40.

Any or all of the various controllers or control modules, such as VSC 50 and BCM 54 may include a microprocessor based central processing unit (CPU) 10 in communication with a memory management unit (MMU) 2 that manages various computer-readable storage media 74. The computer readable storage media preferably include various types of volatile and non-volatile memory such as a read-only memory (ROM) 17, a random-access memory (RAM) 8, and a keep-alive memory (KAM) 7. The computer-readable storage media may be implemented using any of a number of known temporary and/or persistent memory devices such as PROMs, EPROMs, EEPROMs, flash memory, or any other electric, magnetic, optical or combination memory capable of storing data, code, instructions, calibration information, operating variables, and the like used by CPU 10 in controlling the engine, vehicle, or various subsystems. For controller architectures that do not include MMU 2, CPU 10 may communicate directly with one or more storage media 74. CPU 10 communicates with the various sensors and actuators of the engine, vehicle, etc. via an input/output (I/O) interface 82.

Vehicle system 100 may also include one or more emission control devices 56. These may include, for example, a carbon canister for collecting fuel vapors to reduce emissions. From time to time, the carbon canister may be purged, such that collected vapors are taken into the engine air intake system and combusted. Emission control device 56 may also include one or more catalysts or catalytic reactors in various configurations to treat exhaust gases of engine 12. In addition to emissions control or device 56, vehicle system 100 may also include one or more engine or motor driven accessories (AC/DC) 58. Since the accessories 58 use torque produced by engine 12 and/or electrical energy from battery 46 and/or electrical machines 14, 40, one or more of the accessories 58 may be selectively controlled by VSC 50 to more accurately control torque production of engine 12 when operating near the combustion stability limit. For example, an air conditioning system may include a compressor 59 whose operation is adjusted by the controller during selected operating modes to more accurately control operation of engine 12.

In some examples, vehicle system 100 may include an antilock brake system (ABS) 113. The ABS may include wheel speed sensors 114, for example. The ABS may further include at least two hydraulic valves (not shown) within the brake hydraulics (not shown). Controller 50 may monitor rotational speed of each wheel, and responsive to detection of a wheel rotating significantly slower than the others, the ABS 113 may be controlled to reduce hydraulic pressure to the brake 115 at the affected wheel, thus reducing the braking force on said wheel. Alternatively, responsive to detection of a wheel rotating significantly faster than the others, the ABS 113 may be controlled to increase hydraulic pressure to the brake at the affected wheel, thus increasing the braking force on said wheel. In still further cases, as will be discussed in further detail below, ABS 113 may command an increased brake pressure at one or more wheels in order to prevent forward motion of the vehicle responsive to a slowing of the engine 12. Herein, increasing brake pressure at one or more wheels via ABS 113 may be referred to as activating, or applying one or more wheel brakes. For example, ABS 113 may activate, or apply one or more wheel brakes in order to prevent forward motion of the vehicle while the engine 12 is spinning down after accelerating the engine to momentarily increase negative wheel torque, which will be discussed in greater detail below.

Vehicle system 100 may in some examples further include an electronic parking brake system 151. Electronic parking brake system may be utilized in conjunction with the vehicle controller, to engage, or release, electronic parking brake(s) 152, for example. In some examples, the electronic brake system 151 may be utilized by the vehicle controller to engage the electronic parking brake(s) 152 while the engine 12 is spinning down after accelerating the engine as discussed above.

Figure 2:
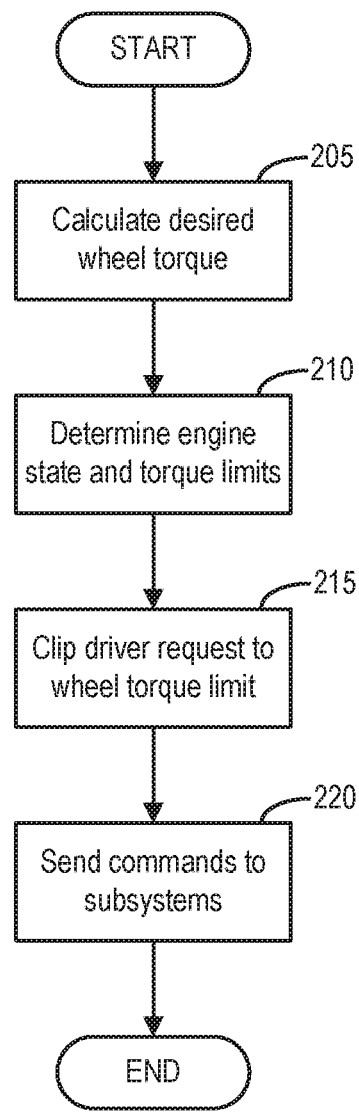
FIG. 2 shows a high level example method illustrating a portion of a reverse drive strategy for a powertrain of the type shown in FIG. 1.

Turning now to FIG. 2, a high level example method 200 for a portion of a reverse drive strategy for a powertrain of the type shown in FIG. 1, is illustrated. Method 200 will be described with reference to the systems described herein and shown in FIG. 1, though it should be understood that similar methods may be applied to other systems without departing from the scope of this disclosure. Method 200 may be carried out by a controller, such as controller 50 in FIG. 1, and may be stored at the controller as executable instructions in non-transitory memory. Instructions for carrying out method 200 may be executed by the controller based on instructions stored on a memory of the controller and in conjunction with signals received from sensors of the vehicle system, such as the sensors described above with reference to FIG. 1. The controller may employ vehicle system actuators, according to the method depicted below.

Method 200 begins at 205, and may include indicating or calculating desired wheel torque during reverse drive operation of the powertrain shown in FIG. 1. Desired wheel torque may be a function of an accelerator pedal position, for example. The vehicle system controller (e.g. 50) controls reverse operation by commanding the desired wheel torque based on accelerator pedal position and system torque limits.

Continuing to 210, the vehicle system controller may determine the engine state, for example, whether the engine is on or off, and may further determine torque limits (e.g. wheel torque limits). At 215, if the vehicle operator-requested torque exceeds a wheel torque limit, the vehicle-operator request may be clipped. At 220, commands are sent by way of control signal flow paths to various powertrain subsystems.

The desired wheel torque may be calculated via a lookup table illustrated at 310 of FIG. 3. The vehicle operator's request for wheel torque is indicated by an accelerator pedal position represented by signal input 305. The wheel torque command, which may be the output of table 310, is a function of vehicle speed. At a torque value of 308, seen at FIG. 3, the signal is clipped. If the engine is off, the wheel torque limit at 308 is simply the negative torque limit of the motor as reported by the controller (e.g. 50), multiplied by a gear ratio. When the engine is on, the wheel torque limit results in a ring gear torque reduction that occurs due to positive engine torque. This may be apparent from an equation defining the steady-state relationship between the engine torque, $\tau_{eng}$, the motor torque, $\tau_{mot}$, and the wheel torque, $\tau_{whl}$, given by:

$$\tau_{whl} = k_{mot2whl}(k_{eng2mot} * \tau_{eng} + \tau_{mot}),\qquad(1)$$

where $k_{mot2whl}$ and $k_{eng2mot}$ are the gear ratios derived from the planetary, the countershaft, and the differential gearing. Motor torque is negative during reverse drive operation, so the positive engine torque may reduce the available reverse torque.

FIG. 3 illustrates how a vehicle system controller (e.g. 50) may in some examples minimize engine use during reverse operation when positive engine torque reduces available reverse torque. Engine torque may only be used when the high voltage battery (e.g. 46) may no longer be able supply the power desired to run the traction motor, and the engine must provide power to the generator, which distributes energy to the motor. The addition of engine power to provide an "engine-on" power adjustment is indicated in table 315, shown at FIG. 3. The engine power during the "engine-on" adjustment is generated only at low torque and high speed.

In FIG. 3, 320 represents a motor torque limit during reverse drive with the engine off, where the constant $k_{mot2whl}$ is the gear ratio from the motor to the traction wheels. Thus, if the engine is kept off, the wheel torque command 335 may be the motor torque limit 320. However, if the engine is on, the wheel torque command 335 may be the sum 325 of the engine-on power adjustment 315 and the motor torque limit. As an example, if the engine is providing a torque of +10 Nm (e.g. 315), and if the motor torque limit 320 in reverse drive is −210 Nm, these two values are summed at 325, so that the wheel torque command 335 would be −200 Nm. Even if the vehicle operator were to command a pedal position 305 corresponding to a commanded wheel torque of −250 Nm, the effective wheel torque command at 335 may still be −200 Nm.

FIG. 4 shows a high level example method 400 illustrating how a vehicle system controller may choose an engine operating point and system limits during reverse drive operation for a powertrain of the type shown in FIG. 1. Method 400 will be described with reference to the systems described herein and shown in FIG. 1, though it should be understood that similar methods may be applied to other systems without departing from the scope of this disclosure. Method 400 may be carried out by a controller, such as controller 50 in FIG. 1, and may be stored at the controller as executable instructions in non-transitory memory. Instructions for carrying out method 400 may be executed by the controller based on instructions stored on a memory of the controller and in conjunction with signals received from sensors of the vehicle system, such as the sensors described above with reference to FIG. 1. The controller may employ vehicle system actuators, according to the method depicted below.

Method 400 begins at 405, and may include indicating whether the battery has a state-of-charge (SOC) capable of meeting the vehicle operator's wheel torque command (e.g. 305). If it is indicated that the battery may meet the commanded wheel torque, the engine is kept off, as shown at 410. Proceeding to 415, method 400 may include calculating an "engine-off" wheel torque limit. It may be understood that step 415 may comprise the same step, or routine, as step 215 depicted at FIG. 2.

Returning to 405, responsive to an indication that the battery is not capable of supplying power needed to satisfy the vehicle operator's request for power, method 400 may proceed to 420. At 420, method 400 may include turning on the engine. For example, turning on the engine may include providing fuel and spark to the engine, as is known in the art. Responsive to turning on the engine at 420, method 400 may proceed to 425. At 425, method 400 may include the vehicle controller (e.g. 50) referring to a precalibrated table of engine speed and torque values for determining an "engine-on" limit adjustment, as previously indicated at 315 in FIG. 3.

Using the value indicated at step 425, the wheel torque limit with the engine on may be calculated at step 430 of method 400. This may involve adding an adjustment determined by table 315 (FIG. 3) to the motor-based reverse limit determined at 320 (FIG. 3). That sum may then be compared to the clipped wheel torque output of table 310 (FIG. 3), to calculate the engine-on wheel torque limit at 430. Method 400 may then end.

As mentioned, a transmission of the kind schematically illustrated in FIG. 1 is characterized by kinematics that may decrease net wheel toque if the engine is motored by the generator using battery power in forward drive. The amount of decrease in net wheel torque is equal to the negative engine torque multiplied by a gear ratio, as exemplified by equation (1) discussed above. If the engine is unfueled, the amount of decrease in net wheel torque is equal to the engine's pumping and friction loss torque times the gear ratio. In reverse drive, this may result in a boost in peak reverse wheel torque of the powertrain to a value beyond the traction motor's capability. This may thus result in improved reverse gradability performance of the vehicle.

For the purpose of an explanation of the kinematics of the powertrain elements using such a reverse drive strategy, reference will be made to FIGS. 5A and 5B.

FIG. 5A shows a lever analogy diagram for the angular velocities and the torques acting on each of the elements of the planetary gear unit. Reference will be made in this description to clockwise motion and counter-clockwise motion. These terms will be used from the persepective of the planetary gear unit 16 as viewed in FIG. 1. The generator would be located on the right side of the planetary gear unit 16 of FIG. 1.

FIG. 5A shows the angular velocities of the ring gear $\omega_r$, the engine $\omega_e$, and the generator $\omega_g$, during reverse drive with the engine on. Carrier angular velocity is the same as engine speed, and the sun gear angular velocity is the same as generator speed. The generator speed is represented in FIG. 5A by relatively long vector $\omega_g$. Sun gear (e.g. 24) is driven in a clockwise direction since the ring gear (e.g. 18) is driven in a counter-clockwise direction. The ring gear is driven by the motor through the gearing (e.g. 38). The engine (e.g. 12) drives sun gear (e.g. 24) in a clockwise direction. The ring gear speed, $\omega_r$, is in a counter-clockwise direction. If the generator speed direction is opposite to the generator torque direction, seen in FIG. 5A, the generator may supply power to the battery and the motor.

The generator may be controlled to function as a generator to ensure that the engine runs at its desired speed. Because of the high speed of the generator under this driving mode, either the engine may be shut off or the reverse vehicle speed may be limited when the generator speed is approaching its maximum speed.

The torque acting on the generator is in a counter-clockwise direction as shown at $\tau_g$. That torque is the same as sun gear torque. Ring gear torque shown as $\tau_r$ is in a counter-clockwise direction since it is driven by the motor, which acts in a counter-clockwise direction during reverse drive. Engine torque $\tau_e$ is in a clockwise direction since the engine is fueled at this time.

The effective torque ratio between the ring gear and the carrier is represented by the symbol p. The effective torque ratio between the carrier and sun gear is unity.

The use of a lever analogy to explain kinematics of a gear system is described by H. Benford and M. Leising in SAE paper No. 810102, published in 1981.

In contrast to the lever analogy of FIG. 5A, a corresponding lever analogy for reverse drive where the engine is spun unfueled to improve reverse drive, is illustrated at FIG. 5B. As mentioned, in the case of FIG. 5B, the engine is not fueled. Rather, it may be understood that the engine is being driven, or motored, by the generator (e.g. 14) and carrier (e.g. 20) in a clockwise direction using battery power, as shown at $\omega_e$ in FIG. 5B. The engine braking torque, shown at $\tau_e$, however, is in a counter-clockwise direction, which is the reverse of the engine torque vector for the reverse drive mode with the engine on as illustrated at FIG. 5A. The carrier at this time may act as a reaction element in the planetary gear unit, which may cause the ring gear (e.g. 18) to be driven in a counter-clockwise direction. This is the same direction as the direction of rotation of the motor during reverse drive. The torque at the ring gear that results from the engine reaction brake effect thus may augment the reverse driving torque developed by the motor.

The ring gear torque vector, shown at $\tau_r$, is in a direction opposite to that of the torque vector $\tau_r$, for the diagram of FIG. 5A. The direction of rotation of the ring gear in the diagram of FIG. 5B, as shown at $\omega_r$, is the same as the direction of rotation of the ring gear of the diagram shown at FIG. 5A. The clockwise torque acting on the generator, as shown at $\tau_g$ in FIG. 5B, is in a direction opposite to that of the generator torque vector in the diagram of FIG. 5A. The engine torque, $\tau_e$, is also reversed.

Turning now to FIG. 6, a high-level example method 600, for improving reverse gradability in a vehicle equipped with a powertrain of the type illustrated in FIG. 1, is shown. Method 600 will be described with reference to the systems described herein and shown in FIG. 1, though it should be understood that similar methods may be applied to other systems without departing from the scope of this disclosure. Method 600 may be carried out by a controller, such as controller 50 in FIG. 1, and may be stored at the controller as executable instructions in non-transitory memory. Instructions for carrying out method 600 may be executed by the controller based on instructions stored on a memory of the controller and in conjunction with signals received from sensors of the vehicle system, such as the sensors described above with reference to FIG. 1. The controller may employ vehicle system actuators, according to the method depicted below. It may be understood that some steps of method 600 are the same as those steps described above at method 200. In cases where the steps of method 600 are the same as those of method 200, the same reference numeral will be utilized, although prime notations have been added. In the description of method 600 below, it may be understood that indications of vehicle speed may be provided to the controller via one or more wheel speed sensors (e.g. 114), for example.

Method 600 begins at 205' and may include calculating desired wheel torque. As discussed above, desired wheel torque may be indicated as a function of accelerator pedal position, for example. After a desired wheel torque is calculated at 205', it is determined whether a torque boost (e.g. additional torque) is requested to meet the desired wheel torque request. Such a step is conducted at 610. If a torque boost is not indicated to be requested, method 600 may proceed as previously described above at FIG. 2, with respect to method steps 210', 215', and 220'. Alternatively, if a boost is indicated in order to meet the torque request, method 600 may proceed to 620. At 620, method 600 may include indicating whether the battery is capable of providing the boost, or additional torque request. Such a determination may be made based on a state of charge (SOC) of the battery, battery temperature, etc. If, at 615, the battery is not capable of providing the boost, method 600 may return to 210', and may proceed as previously described above at FIG. 2, with respect to method steps 210', 215' and 220'. However, if the battery can provide the additional torque, method 600 may proceed to 620.

At 620, method 600 may include motoring the engine, unfueled, via the generator. Proceeding to step 625, method 600 may include maximizing engine losses. For example, as engine losses are increased, the torque boost for the motor during reverse drive may be increased. As an example, engine losses may be increased by turning on an air conditioning compressor (e.g. 59) for the vehicle, by adjusting an engine throttle, and/or by changing engine camshaft timing, for example.

Proceeding to 630, method 600 may include commanding engine speed to be as small as possible, to minimize battery power usage. Battery power usage equals engine speed multiplied by engine torque, so smaller engine speeds may result in less battery power usage.

Proceeding to 635, a wheel torque limit may be calculated as a function of motoring the engine unfueled via the generator, to improve reverse gradability.

In some examples, motoring the engine unfueled via the generator, where engine losses are maximized and engine speed is minimized, may provide the requested torque. However, in other examples, additional torque may be desired. Additional torque request may be indicated, for example, by a position of an accelerator pedal. Thus, proceeding to 640, it may be indicated as to whether additional torque is requested to meet the wheel torque request. In some examples, additional wheel torque may be indicated to be requested responsive to the vehicle speed not moving, or remaining below a threshold speed (e.g. >−1 kph), for a predetermined threshold duration (e.g. 2 seconds) while the vehicle is being motored via the generator, with engine losses maximized and engine speed minimized. For example, if the vehicle wheels are stuck, or if there is an obstacle in the way of the wheels, the vehicle may not move (or the vehicle speed may remain below the threshold vehicle speed) upon operating the vehicle in reverse with the engine motored by the generator, and where engine losses are maximized and engine speed minimized. In such an example, additional torque may be indicated to be requested. In some examples, such an indication may further be provided to the vehicle controller based on a position of an accelerator pedal. For example, if the accelerator pedal is within a predetermined percentage of a maximum amount of depression (e.g. within 10% of the maximum), it may be indicated that additional torque may be requested. In other words, in some cases, the torque boost provided via motoring the engine unfueled via the generator, where engine losses are maximized and engine speed is minimized, may not always provide a desired wheel torque to propel a vehicle in reverse. Thus, if additional torque is indicated to be requested at 640, method 600 may proceed to method 700 depicted below at FIG. 7.

Turning to FIG. 7, a high-level example method 700 illustrating the strategy of the present invention for improving reverse drive performance in a split power delivery hybrid vehicle of the type illustrated in FIG. 1. More specifically, method 700 may proceed from method 600, under conditions where motoring the engine unfueled via the generator with engine losses maximized and engine speed minimized, did not provide enough torque boost to move the vehicle as desired. Method 700 may be carried out by a controller, such as controller 50 in FIG. 1, and may be stored at the controller as executable instructions in non-transitory memory. Instructions for carrying out method 700 may be executed by the controller based on instructions stored on a memory of the controller and in conjunction with signals received from sensors of the vehicle system, such as the sensors described above with reference to FIG. 1. The controller may employ vehicle system actuators, according to the method depicted below. In the description of method 700 below, it may be understood that indications of vehicle speed may be provided to the controller via one or more wheel speed sensors (e.g. 114), for example.

Method 700 begins at 705, and may include accelerating the engine via the generator for a predetermined duration. In some examples, the engine may be accelerated at a predetermined rate, for the predetermined duration. In other examples, the engine may be accelerated at a rate that is proportional to a position of the accelerator pedal. At 705, it may be understood that accelerating the engine is conducted with the engine unfueled. Accelerating the engine may result in a negative torque to the wheels that is proportional to the rate that it is accelerated, as torque equals inertia multiplied by acceleration. Thus, by rapidly accelerating the engine, the vehicle may be propelled in reverse under circumstances where it otherwise may not move. For example, the vehicle may not move responsive to conducting the strategy of method 600, but may move responsive to acceleration of the engine at 705.

Subsequent to accelerating the engine at 705, method 700 may proceed to 710. At 710, method 700 may include indicating whether additional torque is requested. Additional torque may be indicated to be requested, for example, responsive to an indication that the vehicle is not moving, or is remaining below a threshold speed (e.g. >−1 kph), for a predetermined duration (e.g. 2 sec or more). In other words, if the vehicle remains stuck, does not overcome an obstacle (e.g. curb, etc.), or does not progress up a steep incline in reverse, it may be indicated that additional torque may be requested. In some examples, additional torque may be indicated to be requested responsive to the engine being spun at its maximum speed for the predetermined duration. Thus, at 710, if it is indicated that additional torque is not requested, method 700 may proceed to 715. At 715, method 700 may include operating the engine according to driver demand. Method 700 may then end.

Alternatively, returning to 710, responsive to an indication that additional torque is requested, method 700 may proceed to 720. At 720, method 700 may include applying vehicle brakes (e.g. 115, 152). With the brakes applied, method 700 may proceed to 725. At 725, method 700 may include decreasing engine speed. By applying the brakes while engine speed is decreasing, the vehicle may be prevented from rolling forward while the engine is slowing down, as the torque from slowing the engine speed may provide a positive torque to the wheels. At 730, method 700 may include indicating whether engine speed has decreased to or beyond a threshold engine speed decrease. In some examples, the threshold speed may comprise a stopped engine, or a substantially stopped engine (e.g. engine speed less than 1000 rpm). If, at 730, engine speed has not decreased to or beyond the threshold, method 700 may continue to decrease engine speed. Alternatively, responsive to an indication that engine speed has decreased to or beyond the threshold engine speed, method 700 may proceed to 735, and may include releasing the brakes. Upon releasing the brakes at 735, method 700 may return to 705, and may include accelerating the engine again unfueled via the generator, which may provide another momentary increase in negative wheel torque.

While not explicitly illustrated, a similar process may be utilized to momentarily increase torque in a forward direction. For example, if vehicle controls detect that the wheels are not rotating, or if the vehicle speed remains below a threshold speed for a predetermined duration while a maximum positive torque is being applied to the wheels, the engine may be slowed down rapidly. In such an example, torque from slowing the engine may increase torque in the forward direction, which may result in the vehicle being propelled in the forward direction.

Turning now to FIG. 8, a lever analogy diagram for the angular velocities and the torques acting each of the elements of the planetary gear unit, is shown. More specifically, FIG. 8 shows the lever analogy diagram of FIG. 5B, where an increase gradability enabled by accelerating the engine unfueled according to the method of FIG. 7, is illustrated as dashed lines for angular velocities of the ring gear $\omega_r$, the engine $\omega_e$, and the generator $\omega_g$, during reverse drive, together with dashed lines for generator torque $\tau_g$, ring gear torque $\tau_r$, and engine torque $\tau_e$. Such a lever analogy diagram may serve to indicate how reverse gradability may be improved by accelerating the engine to increase wheel torque in reverse. It may be understood that any reference to clockwise and counter-clockwise motion in FIG. 5B may translate to the description of FIG. 8.

As indicated at FIG. 8, angular velocity of the engine $\omega_e$, and the angular velocity of the generator $\omega_g$, are increased (indicated via dashed lines) responsive to accelerating the engine according to the method of FIG. 7, as opposed to the method of FIG. 6 where engine speed is minimized and engine losses maximized. Furthermore, the ring gear torque vector $\tau_r$, engine torque vector $\tau_e$, and the generator torque vector $\tau_g$, are all in the same direction as the torque vectors indicated at FIG. 5B. However, the length of each of the torque vectors are increased for each of the ring gear torque vector $\tau_r$, engine torque vector $\tau_e$, and the generator torque vector $\tau_g$ (each indicated as dashed lines), as compared to the same torque vectors of FIG. 5B. Thus, it is the increase in negative torque provided to the wheels via the engine, above and beyond an amount of negative torque that can be provided by motoring the engine unfueled with engine speed minimized and engine losses maximized, that may improve reverse gradability according to the present invention.

Turning now to FIG. 9, an example timeline 900 for improving reverse gradability in a split power delivery hybrid vehicle of the type illustrated in FIG. 1, according to the method of FIG. 7, is shown. Timeline 900 includes plot 905, indicating an engine speed, over time. Engine speed may be increased (+), or decreased (−). Timeline 900 further includes plot 910, indicating an engine torque, over time. In example timeline 900, engine torque may be indicated to be negative (−), or more negative (−−−). Timeline 900 further includes plot 915, indicating a generator torque, over time. In example timeline 900, generator torque may be indicated to be positive (+), or more positive (+++). Timeline 900 further includes plot 920, indicating a wheel torque, over time. In example timeline 900, wheel torque may be negative (−), or more negative (−−−). Timeline 900 further includes plot 925, indicating a motor torque, over time. In example timeline 900, motor torque may be negative (−), or more negative (−−−). Timeline 900 further includes plot 930, indicating whether additional wheel torque is requested (yes), or not (no). It may be understood that additional wheel torque requested may comprise additional wheel torque beyond what is achievable by utilizing the method depicted at FIG. 6, including motoring the engine unfueled with engine speed minimized and engine losses maximized.

At time t0, it may be understood that a vehicle operator is requesting a reverse wheel torque beyond that achievable through the motor alone. In other words, it may be understood at time t0 that the vehicle controller is attempting to provide increased reverse wheel torque by utilizing the method depicted at FIG. 6, where the engine is being motored unfueled by the generator, with engine speed minimized and engine losses maximized. Thus, engine speed is indicated to be low, and engine torque is negative, as the engine is being motored unfueled. Generator torque is positive, indicated by plot 915. Wheel torque is negative, indicated by plot 920. Motor torque is negative, indicated by plot 925. Furthermore, additional wheel torque is not yet requested, as the vehicle controller is attempting to utilize the strategy of method 600 to propel the vehicle in reverse.

At time t1, additional wheel torque is requested. In other words, it may be understood that the strategy of attempting to propel the vehicle in reverse by motoring the engine unfueled with engine speed minimized and engine losses maximized, was not successful in propelling the vehicle in reverse. For example, between time t0 and t1, it may be understood that vehicle speed may have remained below a threshold speed (e.g. >−1 kph), for a predetermined duration (e.g. 2 seconds or more). Accordingly, at time t1, the vehicle controller may attempt to propel the vehicle in reverse by utilizing the method depicted at FIG. 7. Accordingly, at time t2, engine speed is rapidly increased via the generator, with the engine remaining unfueled. Between time t2 and t3, with engine speed increasing while being motored unfueled, engine torque becomes more negative, indicated by plot 910. To rapidly accelerate the engine unfueled, the generator is utilized, and as such, generator torque is increased (e.g. made more positive), indicated by plot 915. Motor torque remains constant between time t2 and t3.

At time t3, it is indicated that the additional wheel torque is no longer requested. In other words, an indication may be provided to the controller that vehicle speed has increased above a threshold speed, and/or that the vehicle wheels are rotating, indicating that the vehicle is being propelled in reverse, and has overcome whatever obstacle that was impeding its reverse operation. Responsive to the indication at time t3 that the vehicle is being propelled in reverse, following the momentary increase in reverse wheel torque provided via accelerating the engine, the engine may be controlled according to driver demand. Thus, between time t3 and t4, driver demand is such that the generator torque is reduced, and accordingly, wheel torque is made less negative. Between time t4 and t5, the vehicle is operated in reverse, according to driver demand.

While example timeline 900 depicts an example where the engine is accelerated unfueled only once to enable the vehicle to be propelled in reverse, it may be understood that in some cases the vehicle may not be enabled to be propelled in reverse after a single unfueled engine acceleration. As discussed above, in such examples, vehicle brakes may be applied, and the engine may be spun down (e.g. to rest or to below a threshold speed). Subsequent to being spun down, the engine may be accelerated unfueled for as many times as desired, in an attempt to propel the vehicle in reverse, and overcome whatever obstacle or impedance is preventing the vehicle from being propelled in reverse.

In this way, reverse gradability in a split power delivery hybrid vehicle of the type illustrated in FIG. 1, may be improved. By improving reverse gradability, a vehicle may be able to overcome obstacles or proceed up steep grades where a split power delivery hybrid vehicle may otherwise not be able to. Such an improvement may improve customer satisfaction.

The technical effect is to recognize that reverse gradability may be improved by rapidly accelerating the engine unfueled via a generator, as opposed to strategies that spin the engine unfueled at a minimum speed. A further technical effect is to recognize that such a procedure may be carried out any number of times in an attempt to propel the vehicle in reverse. If, after accelerating the engine, the vehicle is not indicated to be being propelled in reverse, the engine may be spun down with a vehicle brake pedal applied, to prevent forward motion during the spinning down of the engine. Once the engine speed is below a threshold speed, the engine may be accelerated again with the vehicle brake released, to further attempt to propel the vehicle in reverse. By enabling an option to repeatedly attempt to propel the vehicle in reverse, reverse gradablity may be improved and customer satisfaction increased.

The systems described herein, and with reference to FIG. 1, along with the methods described herein, and with reference to FIGS. 2-4, and FIG. 7, may enable one or more systems and one or more methods. In one example, a method is provided, comprising accelerating an engine coupled to wheels of a hybrid motor vehicle, the engine accelerated via a generator temporarily functioning as a motor, responsive to a driver-requested negative wheel torque that exceeds a capability of an electric motor, also coupled to one or more of the wheels, to provide the negative wheel torque; and operating the engine based only on driver-demand responsive to vehicle speed increasing beyond a threshold vehicle speed. In a first example of the method, the method further includes wherein the accelerating the engine via the generator provides engine braking torque. A second example of the method optionally includes the first example, and further includes wherein the engine is accelerated at a maximum rate to provide the negative wheel torque. A third example of the method optionally includes any one or more or each of the first and second examples, and further comprises in response to accelerating the engine, and further responsive to an indication that the vehicle speed does not increase beyond the threshold vehicle speed, decreasing engine speed until the engine speed is below a threshold engine speed; and repeating the accelerating the engine to increase vehicle speed to or beyond the threshold vehicle speed. A fourth example of the method optionally includes any one or more or each of the first through third examples, and further includes wherein the decreasing engine speed and repeating the accelerating the engine is conducted any number of times while the driver-requested negative wheel torque exceeds the capability of the motor. A fifth example of the method optionally includes any one or more or each of the first through fourth examples, and further includes wherein the accelerating the engine is conducted with wheel brakes released, the wheel brakes configured to providing braking torque to the wheels; and wherein the wheel brakes are applied in response to the vehicle speed not increasing beyond the threshold vehicle speed, and just prior to decreasing engine speed. A sixth example of the method optionally includes any one or more or each of the first through fifth examples, and further includes wherein the vehicle comprises a powersplit hybrid, the powersplit hybrid including the engine, the electric motor, the generator, a battery, and gearing forming separate power flow paths during forward drive to the wheels from the engine and the electric motor, and from the electric motor and the generator during reverse drive; and wherein the electric motor operates in one direction during forward drive and in a direction opposite to the one direction during reverse drive. A seventh example of the method optionally includes any one or more or each of the first through sixth examples, and further includes wherein accelerating the engine via the generator is conducted in the absence of the engine combusting air and fuel.

Another example of a method comprises rotating an engine that propels a powersplit hybrid vehicle with wheels, unfueled, at a constant engine speed for a first predetermined duration, via a generator acting as a motor, in response to a request for negative wheel torque that exceeds a capability of an electric motor configured to propel the vehicle in reverse; and in response to vehicle speed not reaching or exceeding a threshold vehicle speed during the first predetermined duration, accelerating the engine unfueled via the generator acting as a motor, for a second predetermined duration to increase vehicle speed to or beyond the threshold vehicle speed. In a first example of the method, the method further includes wherein rotating the engine via the generator for the first predetermined duration provides engine braking torque; and wherein engine braking torque is maximized and an engine speed is minimized to meet the request for negative wheel torque. A second example of the method optionally includes the first example, and further includes wherein maximizing engine braking torque and minimizing engine speed is conducted to minimize power consumption during the first predetermined duration. A third example of the method optionally includes any one or more or each of the first and second examples, and further includes wherein engine braking torque is maximized and engine speed minimized by increasing engine driven vehicle accessory loads. A fourth example of the method optionally includes any one or more or each of the first through third examples, and further includes wherein the first predetermined duration comprises two seconds. A fifth example of the method optionally includes any one or more or each of the first through fourth examples, and further includes wherein accelerating the engine unfueled for the second predetermined duration includes maximizing power consumption by maximizing an engine speed rate. A sixth example of the method optionally includes any one or more or each of the first through fifth examples, and further includes wherein in response to elapsing of the second predetermined duration, decreasing engine speed until the engine speed is below a threshold engine speed; and repeating the accelerating the engine unfueled to increase vehicle speed to or beyond the threshold vehicle speed. A seventh example of the method optionally includes any one or more or each of the first through sixth examples, and further includes wherein decreasing engine speed until the engine speed is below the threshold engine speed, and repeating the accelerating the engine unfueled, is conducted any number of times while the request for negative wheel torque exceeds the capability of the electric motor; and wherein a brake is applied to the wheels to prevent forward motion of the vehicle while the engine speed is decreasing. An eighth example of the method optionally includes any one or more or each of the first through seventh examples, and further includes wherein the accelerating the engine provides negative wheel torque in excess of the negative wheel torque provided by rotating the engine unfueled at a constant engine speed.

An example of a system for a hybrid vehicle, comprising a powertrain having an engine, an electric motor, an electric generator, a battery, and a planetary gear unit; one or more brakes configured to apply a braking torque to one or more wheels of the vehicle; and a controller, storing instructions in non-transitory memory that, when executed, cause the controller to: accelerate the engine unfueled via the generator acting as a motor in response to a driver-requested negative wheel torque that exceeds a capability of the electric motor to provide the driver-requested negative wheel torque, where accelerating the engine unfueled provides an engine braking torque that increases negative wheel torque; and in response to the vehicle not reaching or exceeding a threshold vehicle speed during the accelerating the engine, applying the one or more brakes to the one or more wheels; decreasing engine speed to below a threshold engine speed; and repeating the accelerating the engine to increase vehicle speed to or beyond the threshold vehicle speed. In a first example of the system, the system further comprises additional instructions to accelerate the engine in response to the engine being rotated unfueled via the generator for a predetermined duration at a constant engine speed to provide engine braking torque that increases negative wheel torque without the vehicle speed reaching or exceeding the threshold vehicle speed; where the engine is rotated at the constant engine speed in response to the driver-requested negative wheel torque that exceeds the capability of the electric motor to provide the driver-requested negative wheel torque; and wherein engine losses are maximized and engine speed is minimized by increasing engine-driven vehicle accessory loads, to minimize power consumption via the battery for the predetermined duration. A second example of the system optionally includes the first example, and further comprises additional instructions to accelerate the engine at a maximum rate allowable based on at least a state of charge of the battery.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   accelerating an engine coupled to wheels of a hybrid motor vehicle with a wheel brake released, the engine accelerated via a generator temporarily functioning as a motor, responsive to a driver-requested negative wheel torque that exceeds a capability of an electric motor, also coupled to one or more of the wheels, to provide the negative wheel torque; and
   in response to accelerating the engine and further responsive to a vehicle speed not increasing beyond a threshold vehicle speed, applying the wheel brake just prior to decreasing engine speed to below a threshold engine speed, and repeating accelerating the engine with the wheel brake released to increase the vehicle speed to or beyond the threshold vehicle speed.

2. The method of claim 1, wherein the accelerating the engine via the generator provides engine braking torque.

3. The method of claim 1, wherein the engine is accelerated at a maximum rate to provide the negative wheel torque.

4. The method of claim 1, wherein the decreasing engine speed and repeating the accelerating the engine is conducted any number of times while the driver-requested negative wheel torque exceeds the capability of the electric motor.

5. The method of claim 1, wherein the vehicle comprises a powersplit hybrid, the powersplit hybrid including the engine, the electric motor, the generator, a battery, and gearing forming separate power flow paths during forward drive to the wheels from the engine and the electric motor, and from the electric motor and the generator during reverse drive; and
   wherein the electric motor operates in one direction during forward drive and in a direction opposite to the one direction during reverse drive.

6. The method of claim 1, wherein accelerating the engine via the generator is conducted in an absence of the engine combusting air and fuel.

7. A method, comprising;
   rotating an engine that propels a powersplit hybrid vehicle with wheels, unfueled, at a constant minimized engine speed for a first predetermined duration, via a generator acting as a motor, in response to a request for negative wheel torque that exceeds a capability of an electric motor configured to propel the vehicle in reverse; and in response to vehicle speed not reaching or exceeding a threshold vehicle speed during the first predetermined duration, accelerating the engine unfueled via the generator acting as the motor at a maximized engine speed, for a second predetermined duration to increase vehicle speed to or beyond the threshold vehicle speed.

8. The method of claim 7, further comprising maximizing engine losses for the first predetermined duration.

9. The method of claim 8, wherein maximizing engine losses includes increasing engine-driven vehicle accessory loads during the first predetermined duration.

10. The method of claim 7, wherein the minimized engine speed minimizes power consumption from a battery during the first predetermined duration.

11. The method of claim 7, wherein the first predetermined duration comprises two seconds and the second predetermined duration comprises two seconds or more.

12. The method of claim 7, wherein accelerating the engine unfueled for the second predetermined duration includes maximizing battery power consumption by accelerating the engine unfueled at the maximized engine speed.

13. The method of claim 7, wherein in response to elapsing of the second predetermined duration, applying a brake to the wheels and decreasing engine speed until the engine speed is below a threshold engine speed; and
releasing the brake and re-accelerating the engine unfueled via the generator for another predetermined duration to increase vehicle speed to or beyond the threshold vehicle speed.

14. The method of claim 13, wherein decreasing engine speed until the engine speed is below the threshold engine speed, and re-accelerating the engine unfueled, is conducted any number of times while the request for negative wheel torque exceeds the capability of the electric motor.

15. The method of claim 7, wherein the accelerating the engine at the maximized engine speed provides negative wheel torque in excess of the negative wheel torque provided by rotating the engine unfueled at the constant minimized engine speed.

16. A system for a hybrid vehicle, comprising:
a powertrain having an engine, an electric motor, an electric generator, a battery, and a planetary gear unit;
one or more brakes configured to apply a braking torque to one or more wheels of the vehicle; and
a controller, storing instructions in non-transitory memory that, when executed, cause the controller to:
accelerate the engine unfueled via the generator acting as a motor in response to a driver-requested negative wheel torque that exceeds a capability of the electric motor to provide the driver-requested negative wheel torque, where accelerating the engine unfueled provides an engine braking torque that increases negative wheel torque; and
in response to the vehicle not reaching or exceeding a threshold vehicle speed during the accelerating the engine, applying the one or more brakes to the one or more wheels; decreasing engine speed to below a threshold engine speed; and repeating the accelerating the engine to increase vehicle speed to or beyond the threshold vehicle speed.

17. The system of claim 16, further comprising additional instructions to accelerate the engine in response to the engine being rotated unfueled via the generator for a predetermined duration at a constant engine speed to provide engine braking torque that increases negative wheel torque without the vehicle speed reaching or exceeding the threshold vehicle speed;
where the engine is rotated at the constant engine speed in response to the driver-requested negative wheel torque that exceeds the capability of the electric motor to provide the driver-requested negative wheel torque; and
wherein engine losses are maximized and engine speed is minimized by increasing engine-driven vehicle accessory loads, to minimize power consumption via the battery for the predetermined duration.

18. The system of claim 16, further comprising additional instructions to accelerate the engine at a maximum rate allowable based on at least a state of charge of the battery.

* * * * *